United States Patent [19] [11] Patent Number: 4,747,045
Harigai et al. [45] Date of Patent: May 24, 1988

[54] INFORMATION PROCESSING APPARATUS HAVING AN INSTRUCTION PREFETCH CIRCUIT

[75] Inventors: Hisao Harigai; Toshiya Takahashi; Tamotsu Iwasaki, all of Tokyo, Japan

[73] Assignee: NEC Corporation, Tokyo, Japan

[21] Appl. No.: 749,143

[22] Filed: Jun. 26, 1985

[30] Foreign Application Priority Data

Jun. 26, 1984 [JP] Japan ................................ 59-131476

[51] Int. Cl.[4] ............................................. G06F 9/22
[52] U.S. Cl. .................................................... 364/200
[58] Field of Search ... 364/200 MS File, 900 MS File

[56] References Cited

U.S. PATENT DOCUMENTS

| 3,401,376 | 9/1968 | Barnes et al. | 364/200 |
| 3,551,895 | 12/1970 | Driscoll | 364/200 |
| 3,577,190 | 5/1971 | Cocke et al. | 364/200 |
| 3,764,988 | 10/1973 | Onishi | 364/200 |
| 4,106,090 | 8/1978 | Erickson et al. | 364/200 |
| 4,298,933 | 11/1981 | Shimokawa et al. | 364/200 |

Primary Examiner—David Y. Eng
Attorney, Agent, or Firm—Sughrue, Mion, Zinn, Macpeak & Seas

[57] ABSTRACT

An information processing apparatus with an instruction prefetch unit is disclosed, in which a CPU operation can be stopped at a desired address in response to a break signal. The instruction prefetch unit has an instruction prefetch circuit storing an instruction and an indication register storing the break signal. A read operation and a write operation of the indication register are executed together with those of the instruction prefetch circuit. Thus, a break point can be set a desired address by using the indication register, and the break operation can be correctly preformed without the need for complex hardware.

11 Claims, 5 Drawing Sheets

INFORMATION PROCESSING APPARATUS HAVING AN INSTRUCTION PREFETCH CIRCUIT

BACKGROUND OF THE INVENTION

1. Field of the Invention

The present invention relates to an information processing apparatus having an instruction prefetch circuit, and more particularly to a microprocessor, including a read-write memory in which a plurality of instructions to be executed are prefetched and a central processing unit (CPU) which executes a program according to the instructions in the read-write memory.

2. Description of the Prior Art

It is well known that in an information processing apparatus (referred to as "microprocessor" hereinafter) the controlability of an execution sequence is one of the important features of a microprocessor. The controlability means the ability to stop the execution of a CPU at an arbitrary address. In a debugging operation of a software development, for example, an operator tries to stop the CPU operation after a predetermined instruction has been executed in order to observe the status of the CPU at the timing when the instruction execution is stopped. Thus, the operator can check the CPU operation and can evaluate the developed software effectively. The stop of the CPU operation is usually called "break" and the address to be stopped is called "break address" or "break point". This break operation is often required in the microprocessor for reasons other than the above-mentioned debugging operation. It is required, for instance, in an interruption operation, a holding operation, a jump operation, a stand-by operation, or the like.

A microprocessor is integrated on a single semiconductor chip and is coupled to an instruction memory chip via a signal bus. The microprocessor sends an address to the instruction memory through the signal bus in a program execution sequence and fetches the accessed instruction in an instruction register provided therein. The fetched instruction is thereafter decoded and is applied to a CPU as control signals. The CPU executes the instruction according to the applied control signals and transfers a result of the execution to a designated device, e.g. a memory, a peripheral equipment, another microprocessor. Thereafter, the microprocessor sends a next address, for accessing a next instruction to be executed, to the instruction memory through the signal bus. A program may be performed by repeating the above described processing steps.

In this case, if the break operation is required at a certain address, a break address at which an instruction execution is to be stopped is preliminarily set in a register means. This register means is coupled to an address comparator which is coupled to the signal bus in order to compare an address transferred to the instruction memory through the signal bus with the break address in the register means. The address comparator generates a break signal when the address or the signal bus coincides with the break address and applies it to the microprocessor. The microprocessor stops an execution of an instruction which will be prearranged in the next step. Thus, in a conventional microprocessor, the break operation has been performed.

Recently, in order to reduce an instruction memory access period and to use a signal bus effectively, an instruction prefetch technique has been proposed. This technique employs the "locality of an instruction" and will be applied to a microprocessor intergrated on a single semiconductor chip. The "locality of an instruction" means that an instruction to be executed next in the series of instructions, which are now being executed, is the instruction which is designated by the address subsequent to the address corresponding to the instruction which is now executing. That is, in a program sequence, the probability is the highest that an instruction designated by the next subsequent address should be the instruction to be executed in the next step. According to this locality of an instruction, a plurality of subsequent instructions can be preliminarily fetched in a microprocessor before an execution of the current instruction is terminated. The prefetch operation can be performed during the current instruction execution by using a signal bus when this bus is an idle state. Program processing speed may be significantly improved by the instruction prefetch technique.

However, if the instruction prefetch technique is applied to a microprocessor, the above-mentioned break operation becomes very difficult and complex since the break address detected by the comparator is different from the address which has been used to designate the instruction now being executed. In other words, when the break signal is generated from the comparator, the microprocessor is executing an instruction which was previously prefetched. This instruction is not the instruction to be stopped by the break signal. Thus, when the break operation is effected in a microprocessor with an instruction prefetch function, the execution of the program is stopped at the address different from the address to be actually stopped.

To avoid this defect, hardware is required for monitoring the CPU operation and the instruction prefetch operation. Further, status information indicating the state of the CPU operation is required and must be taken out of the microprocessor chip. In general, production of the status information is very difficult since the CPU operation sequence is very complex. Therefore, many complex circuits are required and must be added to the microprocessor.

SUMMARY OF THE INVENTION

An object of the present invention is to provide an information processing apparatus with an instruction prefetch circuit in which the break operation can be easily performed.

Another object of the present invention is to provide an information processing apparatus whose execution sequence can be stopped at a desired address.

Still another object of the present invention is to provide an information processing apparatus suitable for a debugging operation.

Still another object of the present invention is to provide an information processing apparatus applicable to an evaluation processor which can be used to develop software.

An information processing apparatus of the present invention comprises a central processing unit (CPU) executing instructions according to a program and an instruction prefetch unit which includes an instruction register for temporarily storing at least one instruction and an indication register for storing at least one break signal indicating stop of the CPU operation.

According to the present invention, the break signal to stop the CPU operation is temporarily stored in the indication register of the instruction prefetch unit in 1:1 relationship with the prefetched instruction. In other words, the break signal is not directly applied to a break means of the CPU when it is generated, but is stored in the indication register once. The stored break signal is thereafter read-out of the indication register of the instruction prefetch unit and is actually used to stop the CPU operation at the correct time that stop of the CPU operation is desired. As a result, in an information processing apparatus having an instruction prefetch function, the break operation can be correctly performed without monitoring the CPU operation. Further, it may be unnecessary to produce a status information indicating the CPU operation and to take out the status information of the information processing apparatus. In addition the indication register is only used to temporarily store the break signal, so that it can be provided by a simple and small storage circuit, like the instruction prefetch circuit.

In the present invention, the break signal may be generated from the comparing means as described in the prior art. The break signal further may be applied to the indication register directly or may be applied to it via a control circuit which receives not only the break signal but also another signal, such as an address signal or a bus strobe signal indicating a signal bust utilization condition. The control circuit generates a plurality of control signals including the break signal according to the received input signals.

Further, in the case that a plurality of instruction prefetch registers are employed to prefetch a plurality of instructions, a plurality of indication registers may be employed corresponding to the prefetch registers. In this case, a break signal can be stored in one of the indication registers at the same time that an instruction is stored in the respective prefetch register. Further, the break signal stored in the indication register can be read-out thereof at the same time that the instruction is read-out of the prefetch register. Therefore, a read-write control circuit can be commonly used in both the instruction prefetch register and the indication register.

Though the break signal and the instruction are simultaneously read-out of the instruction prefetch unit, the break operation can be performed at will. Namely, the break operation may be performed after the execution of the instruction, which is simultaneously read-out, is terminated or may be performed before that instruction execution is started. Of course, when the break signal is read-out, the break operation may be performed immediately or after a predetermined period.

Furthermore, an interrupting circuit can be used to activate the break operation of applying the break signal to the interruption circuit as an interruption signal. The break signal read-out of the indication register may be applied to a stop control means or anything else employed in an information processing apparatus besides the interruption circuit.

DETAILED DESCRIPTION OF THE EMBODIMENTS

Figure 1:
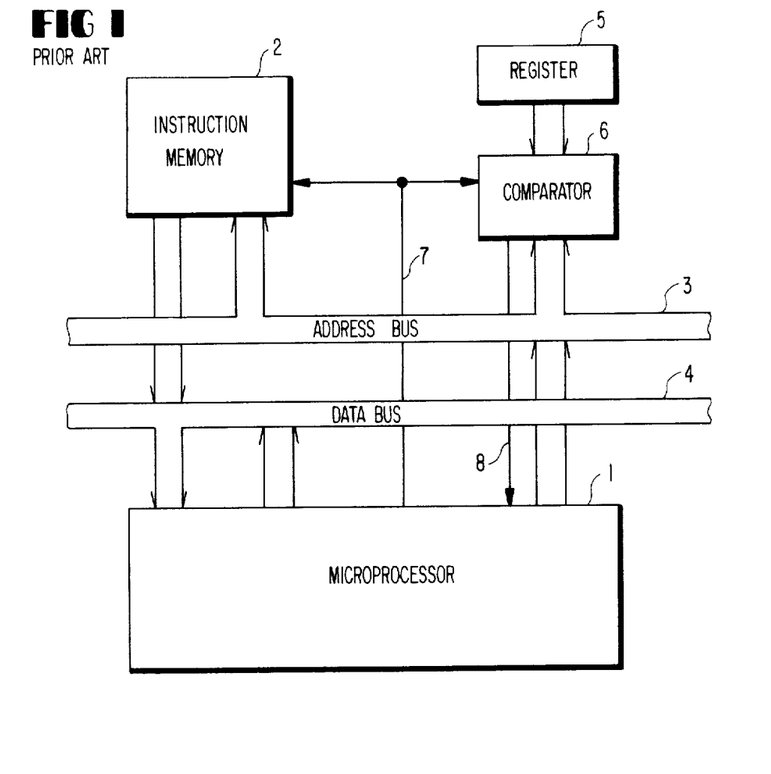
FIG. 1 is a block diagram of a microprocessor system having a conventional microprocessor with no instruction prefetch unit.

FIG. 1 shows a block diagram of a microprocessor system having a conventional microprocessor in which an instruction prefetch unit is not employed. A microprocessor 1 is coupled to an instruction memory 2 by an address bus 3 and a data bus 4. When the microprocessor 1 executes a program, the microprocessor 1 sends an address to the instruction memory 2 through the address bus 3 and fetches a read-out instruction in an instruction register through the data bus 4. The fetched instruction is decoded and applied to a central processing unit (CPU) (not shown) as control signals. The CPU executes a predetermined processing according to the control signals and transfers a result to the data bus, if necessary. In this state, if an interruption or a branch operation is not required, the CPU sends a next subsequent address to the instruction memory 2 to fetch a next new instruction. Thus, instructions are subsequentially executed one by one.

In the case that a break operation is required, a data representing the address to be stopped is preliminarily set in a register 5. A comparator 6 always compares addresses on the address bus 3 to which addresses to access the instruction memory 2 are transferred from the microprocessor 1 with the data set in the register 5 according to a read control signal 7 generated from the microprocessor 1 as a timing signal of an instruction fetch operation. When the data of the register 5 coincides with an address on the address bus 3, the comparator 6 applies a break signal 8 to the microprocessor 1. In response to this break signal 8, the microprocessor 1 stops an execution of a program. At this condition an operator can observe the status of the microprocessor by using a well known debugging procedure.

Figure 2:
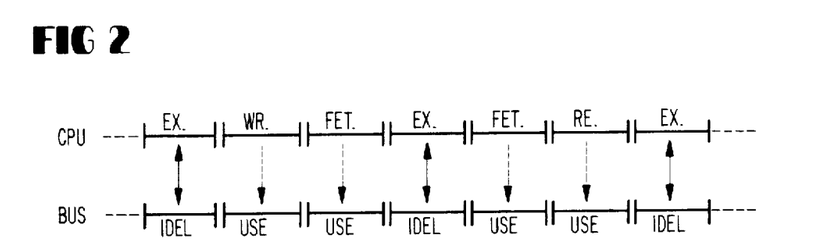
FIG. 2 is an operation flow diagram of a CPU operation and a signal bus status.

In the microprocessor as shown in FIG. 1, however, many instruction fetch operations (FET.) are required a shown in FIG. 2. Further, when an instruction consists of an operation code and an operand, a read operation (RE.) of the operand is further required in addition to the fetch operation (FET.). It is, therefor, difficult to execute a program at a high speed. Moreover, the address bus 3 and the data bus 4 are in an idle state when the microprocessor 1 executes an instruction. Accordingly, the efficientcy of bus utilization is poor.

Figure 3:
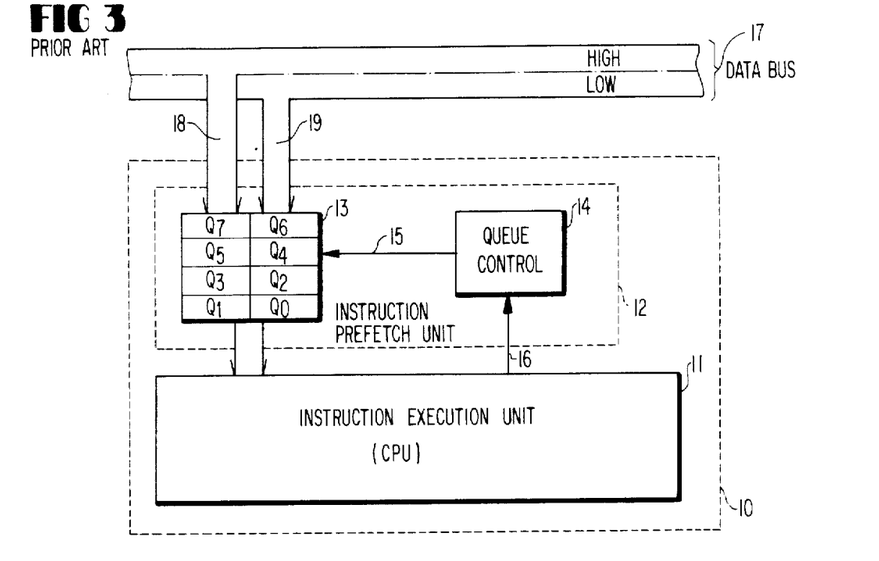
FIG. 3 is a block diagram of a conventional microprocessor with an instruction prefetch unit.

To avoid these defects, a microprocessor shown in FIG. 3 is effective. The microprocessor of FIG. 3 includes an instruction prefetch unit 12 in addition to an instruction execution unit, that is, a CPU 11. The instruction prefetch unit 12 has been developed on the basis of the aforementioned "locality of an instruction" which is a feature of a von Neumann computer. In general, the prefetch unit 12 is provided within a bus interface unit (not shown) and is separated from the CPU 11. The instruction prefetch unit 12 has a memory such as a queue memory 13, and a queue control circuit 14 controlling a read operation and a write operation of the queue memory 13 by control signals 15 which are produced in response to a control signal 16 from the CPU 11. The queue memory 13 may have a storage function. However, since a sequence control of the stored instructions is required, a First-In-First-Out (FIFO) memory is generally used. The queue memory 13 in FIG. 3 has four memory stages, and each stage consists of a higher portion coupled to a higher bus 18 of a data bus 17 and a lower portion coupled to a lower bus 19, respectively. That is, two data (e.g., an operation code and an operand) are simultaneously read-out of an instruction memory and are simultaneously stored in the lower portion ($Q_0$, $Q_2$, $Q_4$ or $Q_6$) and the higher portion ($Q_1$, $Q_3$, $Q_5$ or $Q_7$). $Q_0$ and $Q_1$, $Q_2$ and $Q_3$, $Q_4$ and $Q_5$, and $Q_6$ and $Q_7$ are used as a pair register, respectively. Thus, a plurality of instructions are prefetched in one bus access cycle.

Figure 4:
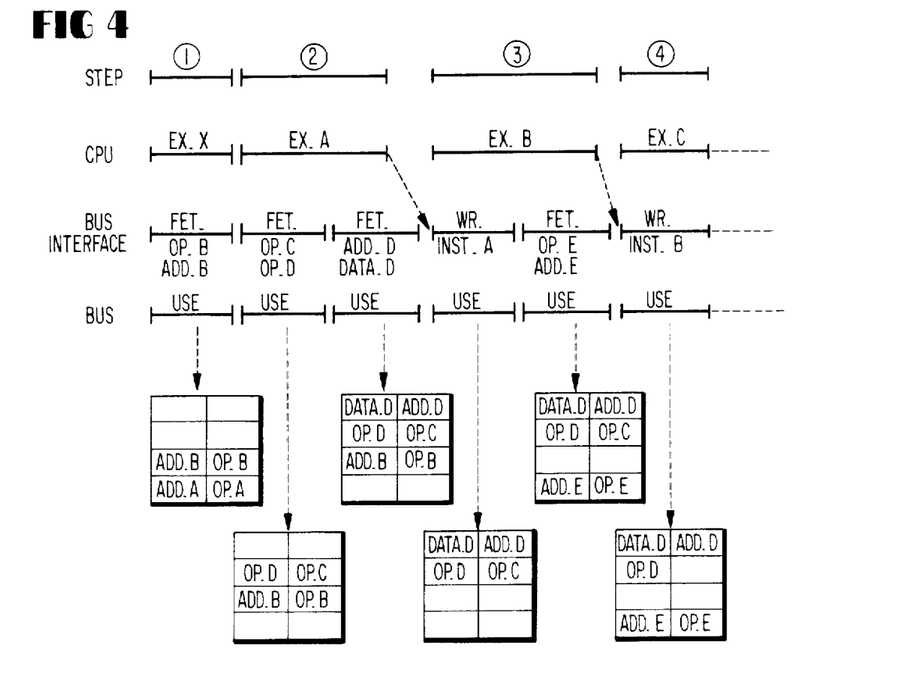
FIG. 4 shows operation flow diagrams of a microprocessor system in which the microprocessor of FIG. 3 is employed.

According to the microprocessor 10 in FIG. 3, the data bus 17 can be effectively utilized as shown in FIG. 4, which indicates an operation flow diagram.

The operation flow will be described with reference to FIG. 4 where it is assumed that instructions X and A have been stored in the queue memory 13 and that the instruction X is read-out of the queue memory 13. The CPU 11 executes the read-out instruction X. At this condition, the data bus 17 is released from the CPU. Therefore, an instruction B consisting of an operation code B and an address field B as an operand is prefetched into the queue memory in a step 1. In this step 1, the operation code B and the address field B are simultaneously transferred through the data bus 11 and are fetched into the a queue $Q_2$ and the queue $Q_3$ via the lower bus 19 and the higher bus 18, respectively. In a subsequent step 2, it is not required to output the result of the execution of the instruction X from the microprocessor 11, so that an execution of the instruction X is started. The CPU 11 sequentially reads the operation code A and the address field A out of the queue memory 13 by means of the queue control circuit 14. Since a long execution period is required in this step 2, an instruction C consisting of an operation code C only and an operation code D of an instruction D are simultaneously fetched into the queue $Q_4$ and $Q_5$, respectively. Further, an address field D and a data field D of the instruction D are continuously fetched into the queues $Q_6$ and $Q_7$, respectively. Thus, the two instructions C and D can be prefetched in two bus access cycles. When the result of the execution of the instruction A must be outputted from the CPU 11 to an external device, such as a random access memory or a peripheral device, the CPU sends the result to the data bus 17 after the prefetch operation of the instruction D is terminated and starts an execution of the next instruction B in a step 3. In this condition, since the data bus 17 is used by the CPU, a new prefetch operation is inhibited. Therefore, the read operation of the instruction B is only performed in the prefetch unit 12. Since, however, a long period is required in the execution of the instruction B, a next instruction E consisting an operation code E and an address field E can be fetched after the writing operation of the result of the instruction A is terminated. In a step 4, the instruction C is executed and the result of the instruction B is transferred to the data bus 17. Therefore, a prefetch operation by which a new instruction is stored in the queues $Q_2$ and $Q_3$ is inhibited.

As described above, by using the microprocessor with the instruction prefetch unit 12, the bus can be used effectively, thus a program can be performed at a high speed. However, if the microprocessor 10 in FIG. 3 is used instead of its microprocessor 1 in FIG. 1, a correct break operation cannot be obtained. Namely, the instruction prefetch operation is performed independent on the CPU operation as described above, so that the CPU 11 is executing an instruction which was fetched in the past when the break signal 8 is generated. Therefore, the break signal 8 obliges the CPU 11 to stop at an undesired address. As a result, an incorrect break operation is performed.

On the other hand, even if an operator tries to set an address different from the address to be actually stopped, the CPU operation sequence and a bus access sequence are very complex and are variable according to instructions to be executed as shown in FIG. 4, and therefore setting of a correct break address is very difficult for the operator. Also, monitoring of the CPU operation and of the instruction prefetch operation is not easy, so that if the monitoring means is added, its structure becomes very complex and many hardware elements are necessarily required.

Figure 5:
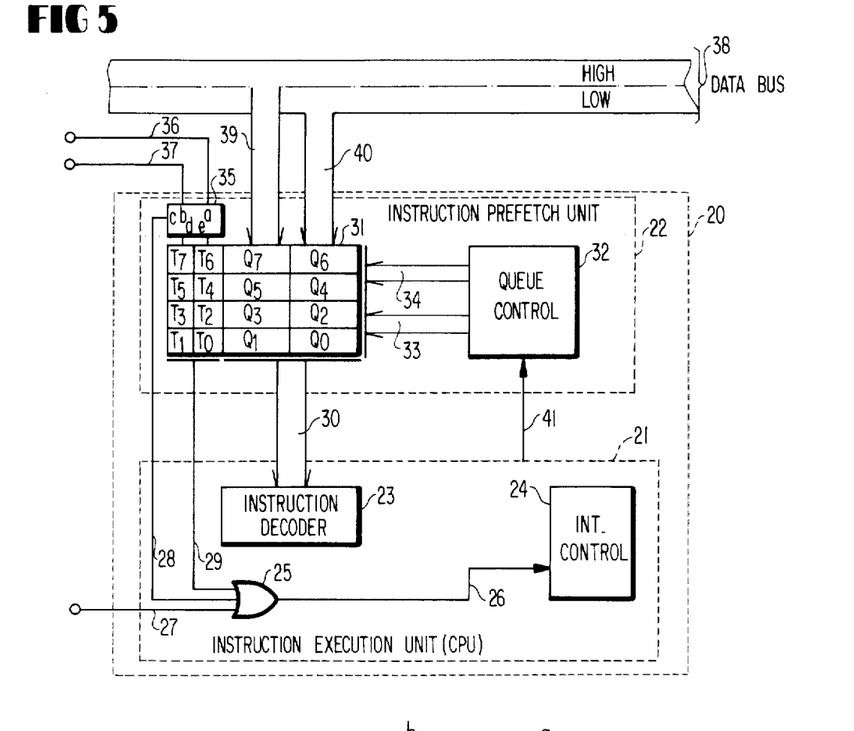
FIG. 5 is a block diagram of a microprocessor of one embodiment according to the present invention.

In contrast, according to an improved microprocessor 20 shown in FIG. 5, a correct break operation can be easily performed with a simple hardware means. The microprocessor 20 includes an instruction execution unit (CPU) 21 and an instruction prefetch unit 22 on a single semiconductor chip. The CPU includes an instruction decoder 23 for decoding instructions to be executed, an interruption control circuit 24 and an instruction execution circuit (not shown). The instruction prefetch unit 22 includes an instruction prefetch register means 31, a queue control circuit 32, and a decoder 35. The instruction prefetch register means 31 may be a queue memory comprising four stages, that is, a first stage $Q_0$ and $Q_1$, a second stage $Q_2$ and $Q_3$, a third stage $Q_4$ and $Q_5$ and a fourth stage $Q_6$ and $Q_7$. The instruction prefetch register means may be the conventional queue memory 13 in FIG. 3. It will be noted in this embodiment that an indication register means $T_0$ to $T_7$ are added to the queue memory. The indication register corresponds to the queue in 1:1 relationship, e.g., $Q_0$-$T_0$, $Q_1$-$T_1$, $Q_2$-$T_2$, $Q_3$-$T_3$, ..., $Q_7$-$T_7$. Elements employed in the indication registers $T_0$ to $T_7$ are the same elements as that of the queue memory. That is, the indication registers and the queue memory can be constituted by flip-flop circuits. The queues $Q_0$, $Q_2$, $Q_4$ and $Q_6$ positioned at a lower part are coupled to a lower bus 40 of a data bus 38, while the queues $Q_1$, $Q_3$, $Q_5$ and $Q_7$ positioned at a higher part are coupled to a higher bus 39 of the data bus 38. The indication registers $T_0$, $T_2$, $T_4$ and $T_6$ corresponding to the queues $Q_0$, $Q_2$, $Q_4$ and $Q_6$ are coupled to an output end e of the decoder 35, while the indication registers $T_1$, $T_3$, $T_5$ and $T_7$ corresponding to the higher queues $Q_1$, $Q_3$, $Q_5$ and $Q_7$ are coupled to an output end d of the decoder 35. The decoder 35 receives coded signals 36 and 37 at input ends a and b, respectively, and generates three outputs at the output ends e, d and c, respectively. The queue control circuit 32 sends a write signal 34 and a read signal 33 to the queue memory and the indication registers in response to a read-write control signal 41 generated from the CPU 21. A read operation and a write operation of the queues and the indication registers are simultaneously performed in the same stage. The write signal 34 includes a write control information and a stage select information, while the read signal 33 includes a read control information and a stage select information. An instruction prefetched in the selected queue is transferred to the instruction decoder 23 via a bus 30 when the read operation is performed. Information stored in the indication register in the same stage as the selected queue is transferred to an OR gate 25 at the same time that the read operation is performed.

Figure 6:
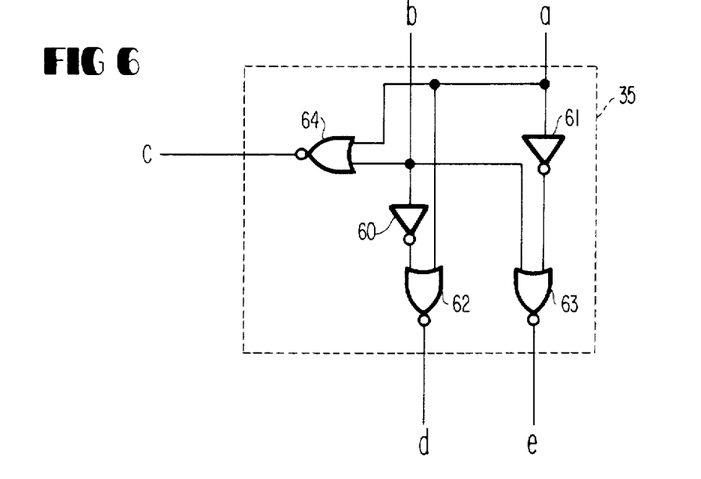
FIG. 6 is a circuit diagram of a control circuit generating control signals including a break signal according to one example of a microprocessor shown in FIG. 5.

The decoder 35 may be constructed by logic gates as shown in FIG. 6 in which two inverters 60 and 61 and three NOR gates 62, 63 and 64 are employed. An operation of the decoder 35 is executed according to Table 1.

TABLE 1

| a | b | c | d | e | MODE |
|---|---|---|---|---|------|
| 0 | 0 | 1 | 0 | 0 | Interruption operation |
| 0 | 1 | 0 | 1 | 0 | Break point set in $T_1$, $T_3$, $T_5$, $T_7$ |
| 1 | 0 | 0 | 0 | 1 | Break point set in $T_0$, $T_2$, $T_4$, $T_6$ |
| 1 | 1 | 0 | 0 | 0 | No break operation |

As shown in Table 1, when the coded signals (0.0) are received, the decoder 35 generates an interruption signal 28 at the output end c. When the coded signals (0.1) are received, the decoder 35 generates a break signal for the higher queue ($Q_1$, $Q_3$, $Q_5$ or $Q_7$) at the output end d. When the coded signals (1.0) are received, the decoder 35 generates a break signal for the lower queue ($Q_0$, $Q_2$, $Q_4$ or $Q_6$) at the output end e. Neither the break signal nor the interruption signal are generated from the decoder 35 when the coded signals (1.1) are received at the input ends a and b.

As described above, since the indication registers $T_0$ to $T_7$ are added to the instruction queue memory $Q_0$ to $Q_7$, the break signal can be easily stored in the indication register, e.g. $T_3$, when the instruction detected as the break point is prefetched in the selected queue, e.g. $Q_3$. Thereafter, when the instruction is read-out of the queue $Q_3$, the break signal is simultaneously read-out of the register $T_3$ in response to the read signal 33. The read-out break signal is applied to the interruption control circuit 24 through the OR gate 25 as an interruption signal. As a result, the break operation can be correctly performed at the desired address according to an interruption operation employed to stop a program sequence. This interruption operation is well known as, for example, a holding operation, a stand-by operation, a wait operation. That is, in this embodiment, the break operation can be easily performed by using the break signal read-out of an indication register as an interruption signal. In other words, more additional complex circuit for the break operation is not required. Of course the break signal may be applied to another circuit provided to stop a CPU operation. Thus, according to this embodiment, the correct break operation can be performed at will without a complex monitoring means.

Further, the break operation may be controlled such that the break operation is performed after the instruction stored in the queue, e.g., $Q_3$, corresponding to the register $T_3$ in which the break signal is stored, has been executed, or before the execution of the instruction in the queue $Q_3$ is started. Namely, the start known as, for example, a holding operation, a stand-by operation, a wait operation. That is, in this embodiment, the break operation can be easily performed by using the break signal read-out of an indication register as an interruption signal. In other words, more additional complex circuit for the break operation is not required. Of course the break signal may be applied to another circuit provided to stop a CPU operation. Thus, according to the embodiment, the correct break operation can be performed at will without a complex monitoring means.

Further, the break operation may be controlled such that the break operation is performed after the instruction stored in the queue, e.g., $Q_3$, corresponding to the register $T_3$ in which the break signal is stored has been executed, or before the execution of the instruction in the queue $Q_3$ is started. Namely, the start timing of the break operation can be controlled by the interruption operation and can be varied by changing a timing of the interruption operation. Moreover, in order to control the start timing of the break operation, the break signal read-out of the indication register may be applied to the OR gate 25 via a delay circuit.

Further, the microprocessor in FIG. 5 is designed such that the break operation can be directly performed regardless of the indication registers $T_0$ to $T_7$. That is, when the coded signals (0.0) are applied to the decoder 35, a break signal 28 is immediately generated and applied to the interruption circuit 24 via the OR gate 25. Therefore, the break operation can be set independent of the instruction prefetch operation. This break signal 28 can be also used when a miss break signal is set in an indication register. That is, when the miss break signal was stored in an indication register by an operator, the operator may input the coded signals (0.0) to the decoder 35. As a result, the CPU operation can be immediately stopped before the CPU executes an undesired break operation. In other words, the undesired break operation according to the indication register can be easily masked by the break signal 28. Moreover, if necessary, an external break signal 27 may be applied to the OR gate 25 to achieve the same effect as the break signals 28 and 29.

Figure 7:
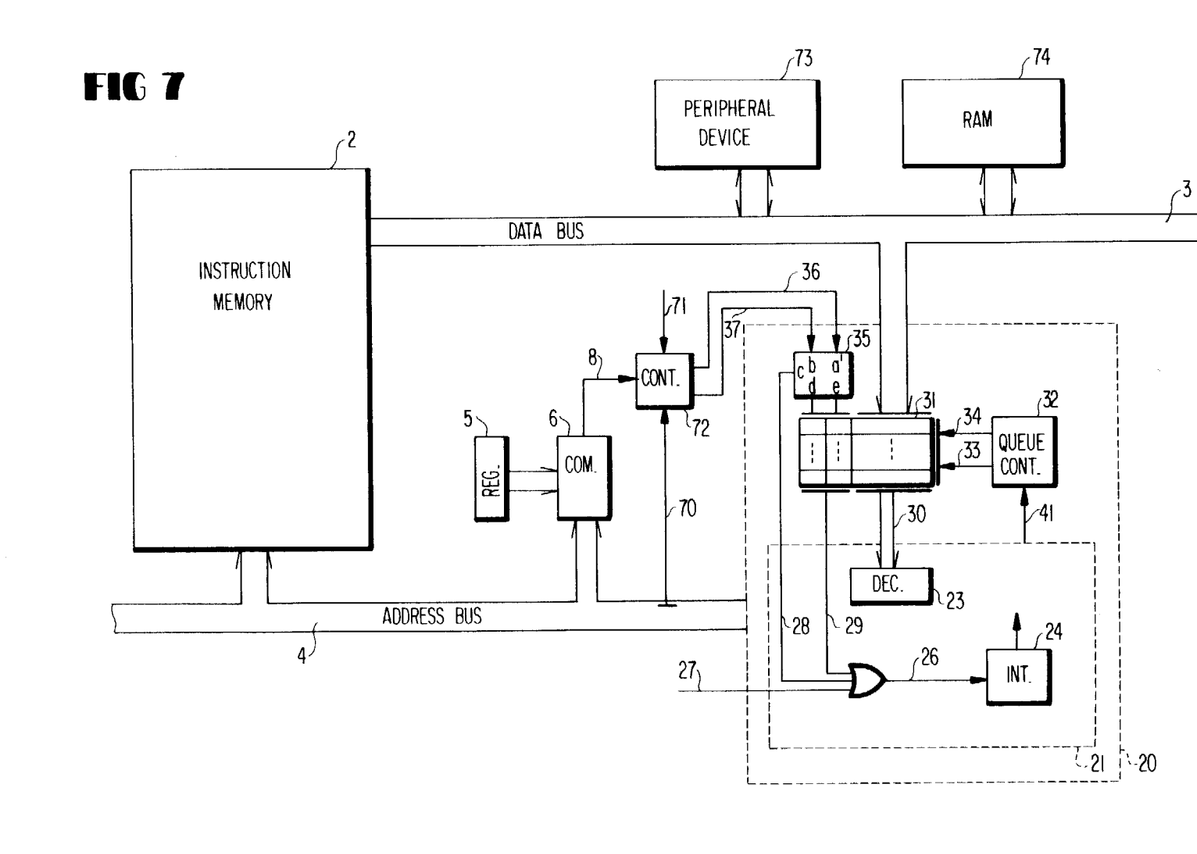
FIG. 7 shows a block diagram according to one embodiment of a microprocessor system in which the microprocessor of FIG. 5 is employed.

FIG. 7 shows a block diagram of a microprocessor system in which the microprocessor 20 in FIG. 6 is employed. The microprocessor 20 is coupled to the instruction memory 2 by the address bus 4 and the data bus 3 as shown in FIG. 1. The data bus 38 (FIG. 5) also can be used as the data bus 3. Further, an external RAM 74 and a peripheral device 73 can be coupled to the data bus 3. The comparator 6 and the register 5 which are required to generate the break signal 8 are provided. Here, the break signal 8 is not directly applied to the microprocessor 20 but is applied to a control circuit 72 which receives an LSB of an address on the address bus 3 and a bus status signal 71. The control circuit 72 generates the coded signals 36 and 37 according to the Table 1. As shown in FIG. 7, by adding a simple circuit 72 to the outside of the microprocessor 20, an improved microprocessor system can be provided.

Figure 8:
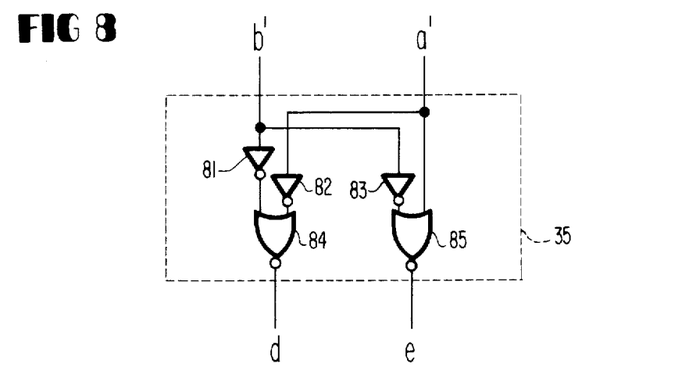
FIG. 8 is another circuit diagram of the control circuit used in FIG. 5.

Furthermore, in the case that the break signal 28 in FIG. 5 is not required, the decoder 35 can be modified as shown in FIG. 8. The decoder in FIG. 8 operates according to Table 2.

TABLE 2

| a' | b' | d | e | MODE |
|----|----|---|---|------|
| 0 | 0 | 0 | 0 | No break operation |
| 1 | 0 | 0 | 1 | Break point set in $T_0$, $T_2$, $T_4$, $T_6$ |
| 0 | 1 | 1 | 0 | Break point set in $T_1$, $T_3$, $T_5$, $T_7$ |
| 1 | 1 | 0 | 0 | No break operation |

The decoder in FIG. 8 includes three inverters 81 to 83 and two NORE gates 84 and 85 and generates a break signal only when the signals (1.0) and (0.1) are received. Therefore, when the LSB of an address on the address bus 4 and the break signal 8 in FIG. 7 are applied directly to the input ends a' and b', respectively, a correct break point can be set in the indication registers. While, when the coded signals (0.0) or (1.1) is applied to the decoder, no break point is set in the indication registers, so that the CPU operation, the bus interface operation and the instruction prefetch operation can be performed according to the flow in FIG. 4. Of course, when the coded signal (1.1) is applied to the decoder in FIG. 5, the operation flow in FIG. 4 is also executed.

Figure 9:
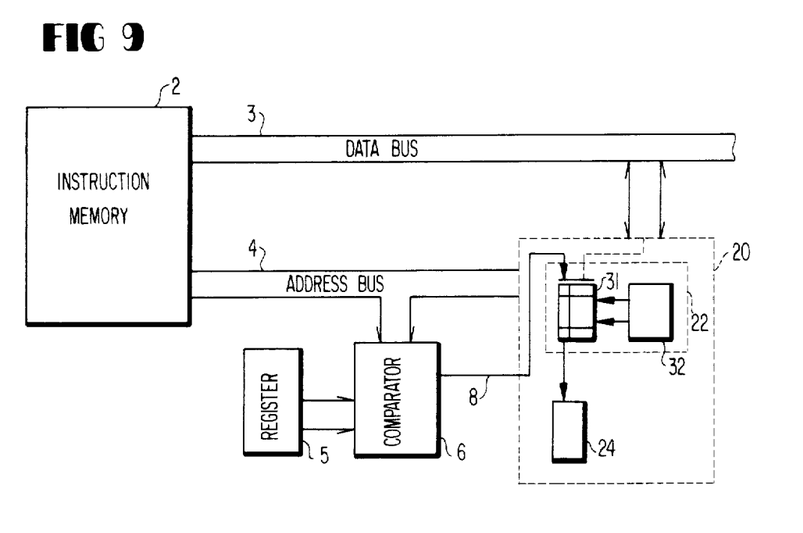
FIG. 9 is a block diagram of a microprocessor system in which the microprocessor having the control circuit shown in FIG. 8 is employed.

In the case that the break signal 8 is directly applied to the indication registers, a microprocessor system may be modified as shown in FIG. 9. In FIG. 9, it will be noted that the break signal 8 must be stored in a selected indication register in sync with an instruction prefetch operation of the queue memory.

What is claimed is:

1. An information processing apparatus with an instruction prefetch function, said apparatus being responsive to instruction signals and break signals from an external source, each said break signal corresponding to a respective instruction signal but being independent of the nature of the instruction signal or the result of an execution of the instruction signal, and comprising:
   an execution unit responsive to said instruction signals for executing at least one of several instructions at a time,
   an instruction prefetch unit for storing instruction signals and break signals, said unit being connected to said execution unit and having an instruction storage means for conducting instruction read-in and read-out operations for temporarily storing at least one of said several instruction signals and an indication storage means for storing at least one break signal designating a break operation that is to occur in relation to said stored instruction signals, said break signals stored in said indication storage means corresponds to respective instruction signals stored in said instruction storage means in a 1:1 relationship and said indication storage means operating to read-in and read-out break signals in synchronism with the read-in and read-out operations of said instruction storage means,
   read means coupled to said instruction storage means and said indication storage means for reading the content of said instruction storage means and the content of said indication storage means, and
   stopping means responsive to said read means for stopping an execution of the read-out instruction signals in said execution unit in response to the read-out break signal.

2. An information processing apparatus as claimed in claim 1, in which said instruction storage means consists of a queue memory.

3. An information processing apparatus as claimed in claim 1, wherein said instruction and said break signal are read-out at the same time.

4. An information processing apparatus as claimed in claim 1, in which said stopping means includes an interruption control circuit for to which said read-out break signal is applied as an interruption signal.

5. An information processing apparatus as claimed in claim 1, further comprising means for directly applying said break signal to said stopping means without storing said break signal in said indication storage means.

6. An information processing apparatus responsive to signals from an external source, said signals comprising instruction signals and break signals, said break signals corresponding to respective instruction signals but being independent of the nature of the instruction signals or the result of an execution of the instruction signals, said apparatus comprising:
   a central processing unit for executing instructions,
   a memory having a first location for storing instruction signals and a second location for storing break signals, said first location and said second location being in 1:1 correspondence and operating in synchronism,
   means for receiving said instruction signals and for writing at least one instruction signal into said first location of said memory for temporary storage,
   means for decoding said temporarily stored instruction signal,
   receiving means for receiving a break signal designating a break operation of said central processing unit that is to occur in relation to said instruction,
   writing means connected between said receiving means and said memory for writing the received break signal into said second location of said memory, said writing occurring before the corresponding instruction in said first location is decoded,
   reading means connected to said memory for reading said instruction signal and said break signal out of said memory, and
   indicating means connected to said reading means for indicating the break operation to said central processing apparatus in response to the read-out break signal.

7. An information processing apparatus as claimed in claim 6, in which said reading means reads the instruction and the break signal out of said first location and said second location, respectively, at the same time.

8. An information processing apparatus as claimed in claim 7, in which the break operation according to the read-out break signal is performed before the read-out instruction is executed in said central processing unit.

9. An information processing apparatus as claimed in claim 7, in which the break operation according to the read-out break signal is performed after the read-out instruction as executed in said central processing unit.

10. An information processing apparatus as claimed in claim 6, in which the read-out break signal is applied to said indicating means through a delay means.

11. An information processing apparatus responsive to signals from an external source, said signals comprising coded instructions and control information, said control information corresponding to a respective instruction and being independent of the nature of the instruction signal or the result of an execution of the instruction signal, said apparatus comprising:
   an instruction executing unit for decoding a coded instruction and executing said decoded instruction,
   first means for storing instructions to be decoded and executed in said instruction executing unit,
   second means for receiving control information,
   third means for generating a first signal indicating a break operation to said instruction executing unit and a second signal indicating an interruption signal, fourth means for temporarily storing said first signal the storage of said fourth means corresponding in 1:1 relationship to said first means and operating in synchronism therewith, fifth means responsive to said second signal for controlling the break operation of said instruction executing unit, and sixth means coupled to said third, fourth and fifth means for applying said first signal in said fourth means and said second signal generated by said third means to said fifth means in order to indicate the break operation.

* * * * *

UNITED STATES PATENT AND TRADEMARK OFFICE
CERTIFICATE OF CORRECTION

PATENT NO. : 4,747,045

DATED : May 24, 1988

INVENTOR(S) : HARIGAI ET AL

It is certified that error appears in the above-identified patent and that said Letters Patent is hereby corrected as shown below:

COLUMN 4, LINE 59  Delete "efficientcy" insert --efficiency--;

COLUMN 5, LINE 64  After "terminated." insert --In the prefetch operation of the step 3, the operation code E and the address field E are stored in the queues $Q_0$ and $Q_1$, respectively because these queues have been cleared after the read operation of the instruction A is terminated.--;

COLUMN 8, LINE 66  Delete "NORE" insert --NOR--.

Signed and Sealed this

Tenth Day of March, 1992

Attest:

HARRY F. MANBECK, JR.

*Attesting Officer*     Commissioner of Patents and Trademarks